(12) United States Patent
Mutoh et al.

(10) Patent No.: US 7,512,140 B2
(45) Date of Patent: Mar. 31, 2009

(54) INTER-RING CONNECTION METHOD AND DEVICE

(75) Inventors: Ryoichi Mutoh, Kawasaki (JP); Kazuto Nishimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 583 days.

(21) Appl. No.: 11/212,284

(22) Filed: Aug. 26, 2005

(65) Prior Publication Data
US 2006/0209859 A1   Sep. 21, 2006

(30) Foreign Application Priority Data
Mar. 17, 2005   (JP) .............................. 2005-077708

(51) Int. Cl.
H04L 12/28 (2006.01)
H04L 12/56 (2006.01)
H04L 1/00 (2006.01)
H04L 12/26 (2006.01)

(52) U.S. Cl. .................. 370/404; 370/222; 370/258; 370/424

(58) Field of Classification Search .............. 370/254, 370/222, 403, 404, 258, 424
See application file for complete search history.

(56) References Cited

U.S. PATENT DOCUMENTS

| | | | | |
|---|---|---|---|---|
| 4,817,088 A | * | 3/1989 | Adams | 370/402 |
| 6,614,757 B1 | * | 9/2003 | Rochberger et al. | 370/231 |
| 2003/0021226 A1 | * | 1/2003 | Mor | 370/223 |
| 2003/0026272 A1 | * | 2/2003 | Nagamine et al. | 370/403 |
| 2003/0117946 A1 | * | 6/2003 | Fontana et al. | 370/216 |
| 2006/0092856 A1 | * | 5/2006 | Mitsumori | 370/254 |

FOREIGN PATENT DOCUMENTS

| | | |
|---|---|---|
| JP | 2003-258822 | 9/2003 |
| WO | WP 2004/095779 | 11/2004 |

* cited by examiner

*Primary Examiner*—Ronald Abelson
(74) *Attorney, Agent, or Firm*—Katten Muchin Rosenman LLP

(57) ABSTRACT

In an inter-ring connection method and device interconnecting a plurality of RPR rings, an inter-ring connecting device (interconnecting station) determines whether or not an RPR frame received from one ring is a broadcast frame; and resets, when the RPR frame determined to be the broadcast frame is relayed to another ring, a ttl of the frame so that a predetermined point between the inter-ring connection device itself and another identical inter-ring connection device opposed within a ring to be relayed is a cleave point. Also, topology information of the one ring is transmitted to another ring; topology information of each ring is held in a topology database; and an RPR frame is relayed (unicasted) between the rings by referring to the topology database based on a destination address of the RPR frame.

8 Claims, 21 Drawing Sheets

FIG.7A

| STATION | Info | HOP NUMBER |
|---|---|---|
| mac ADDRESS S5 | info | 4 |
| mac ADDRESS S2 | info | 3 |
| mac ADDRESS S1 | info | 2 |
| mac ADDRESS S3 | info | 1 |
| MY TOPOLOGY INFO: S4 | | |
| mac ADDRESS S5 | info | 1 |
| mac ADDRESS S2 | info | 2 |
| mac ADDRESS S1 | info | 3 |
| mac ADDRESS S3 | info | 4 |

FIG.7B

| STATION | Info | HOP NUMBER |
|---|---|---|
| mac ADDRESS S2 | info | 4 |
| mac ADDRESS S1 | info | 3 |
| mac ADDRESS S3 | info | 2 |
| mac ADDRESS S4 | info | 1 |
| MY TOPOLOGY INFO: S5 | | |
| mac ADDRESS S2 | info | 1 |
| mac ADDRESS S1 | info | 2 |
| mac ADDRESS S3 | info | 3 |

FIG.7C

| STATION | Info | HOP NUMBER | INTERFACE |
|---|---|---|---|
| mac ADDRESS S2 | info | 3 | #2-1 |
| mac ADDRESS S1 | info | 3 | #2-1 |
| mac ADDRESS S3 | info | 2 | #2-1 |

FIG.7D

| STATION | Info | HOP NUMBER | INTERFACE |
|---|---|---|---|
| mac ADDRESS S7 | info | 4 | #2-1 |
| mac ADDRESS S6 | info | 3 | #2-1 |
| mac ADDRESS S5 | info | 2 | #2-1 |
| mac ADDRESS S4 | info | 1 | #2-1 |
| MY TOPOLOGY INFO: S8 | | | |
| mac ADDRESS S7 | info | 1 | #2-0 |
| mac ADDRESS S6 | info | 2 | #2-0 |
| mac ADDRESS S5 | info | 3 | #2-0 |
| mac ADDRESS S4 | info | 4 | #2-0 |

FIG.9A

| STATION | Info | HOP NUMBER | INTERFACE |
|---|---|---|---|
| mac ADDRESS S2 | info | 3 | #2-1 |
| mac ADDRESS S1 | info | 3 | #2-1 |
| mac ADDRESS S3 | info | 2 | #2-1 |

FIG.9B

| STATION | Info | HOP NUMBER | INTERFACE |
|---|---|---|---|
| mac ADDRESS S7 | info | 4 | #2-1 |
| mac ADDRESS S6 | info | 3 | #2-1 |
| mac ADDRESS S5 | info | 2 | #2-1 |
| mac ADDRESS S4 | info | 1 | #2-1 |
| MY TOPOLOGY INFO: S8 | | | |
| mac ADDRESS S7 | info | 1 | #2-0 |
| mac ADDRESS S6 | info | 2 | #2-0 |
| mac ADDRESS S5 | info | 3 | #2-0 |
| mac ADDRESS S4 | info | 4 | #2-0 |

FIG.9C

| STATION | Info | HOP NUMBER | INTERFACE |
|---|---|---|---|
| mac ADDRESS S5 | info | 4 | #1-1 |
| mac ADDRESS S2 | info | 3 | #1-1 |
| mac ADDRESS S1 | info | 2 | #1-1 |
| mac ADDRESS S3 | info | 1 | #1-1 |
| MY TOPOLOGY INFO: S4 | | | |
| mac ADDRESS S5 | info | 1 | #1-0 |
| mac ADDRESS S2 | info | 2 | #1-0 |
| mac ADDRESS S1 | info | 3 | #1-0 |
| mac ADDRESS S3 | info | 4 | #1-0 |

FIG.9D

| STATION | Info | HOP NUMBER | INTERFACE |
|---|---|---|---|
| mac ADDRESS S8 | info | 4 | #2-1 |
| mac ADDRESS S7 | info | 3 | #2-1 |
| mac ADDRESS S6 | info | 2 | #2-1 |
| mac ADDRESS S5 | info | 1 | #2-1 |
| MY TOPOLOGY INFO: S4 | | | |
| mac ADDRESS S8 | info | 1 | #2-0 |
| mac ADDRESS S7 | info | 2 | #2-0 |
| mac ADDRESS S6 | info | 3 | #2-0 |
| mac ADDRESS S5 | info | 4 | #2-0 |

FIG.9E

| STATION | Info | HOP NUMBER | INTERFACE |
|---|---|---|---|
| mac ADDRESS S2 | info | 4 | #1-1 |
| mac ADDRESS S1 | info | 3 | #1-1 |
| mac ADDRESS S3 | info | 2 | #1-1 |
| mac ADDRESS S4 | info | 1 | #1-1 |
| MY TOPOLOGY INFO: S5 | | | |
| mac ADDRESS S2 | info | 1 | #1-0 |
| mac ADDRESS S1 | info | 2 | #1-0 |
| mac ADDRESS S3 | info | 3 | #1-0 |
| mac ADDRESS S4 | info | 4 | #1-0 |

FIG.9F

| STATION | Info | HOP NUMBER | INTERFACE |
|---|---|---|---|
| mac ADDRESS S4 | info | 4 | #2-1 |
| mac ADDRESS S8 | info | 3 | #2-1 |
| mac ADDRESS S7 | info | 2 | #2-1 |
| mac ADDRESS S6 | info | 1 | #2-1 |
| MY TOPOLOGY INFO: S5 | | | |
| mac ADDRESS S4 | info | 1 | #2-0 |
| mac ADDRESS S8 | info | 2 | #2-0 |
| mac ADDRESS S7 | info | 3 | #2-0 |
| mac ADDRESS S6 | info | 4 | #2-0 |

FIG.12A

| STATION | Info | HOP NUMBER | INTERFACE |
|---|---|---|---|
| mac ADDRESS S1 | info | 4 | #2-1 |
| mac ADDRESS S2 | info | 3 | #2-1 |
| mac ADDRESS S3 | info | 2 | #2-1 |

FIG.12B

| STATION | Info | HOP NUMBER | INTERFACE |
|---|---|---|---|
| mac ADDRESS S7 | info | 4 | #2-1 |
| mac ADDRESS S6 | info | 3 | #2-1 |
| mac ADDRESS S5 | info | 2 | #2-1 |
| mac ADDRESS S4 | info | 1 | #2-1 |
| MY TOPOLOGY INFO: S8 | | | |
| mac ADDRESS S7 | info | 1 | #2-0 |
| mac ADDRESS S6 | info | 2 | #2-0 |
| mac ADDRESS S5 | info | 3 | #2-0 |
| mac ADDRESS S4 | info | 4 | #2-0 |

INTER-RING CONNECTION METHOD AND DEVICE

BACKGROUND OF THE INVENTION

1. Field of the Invention

The present invention relates to an inter-ring connection method and device, and in particular to an inter-ring connection method and device upon establishing a network by a plurality of rings in an RPR (Resilient Packet Ring).

2. Description of the Related Art

A packet ring directly transferring therethrough an Ethernet (registered trademark) frame and the like is noticed in a Metro Area Network, and the RPR is standardized in the IEEE802.17 committee.

Hereinafter, the RPR technology will be schematically described.

RPR Ring

A ring using the RPR (hereinafter, occasionally referred to as RPR ring) is for transferring data by a dual ring arrangement in which two unidirectional rings (hereinafter, referred to as ringlets) are combined in the opposite directions to each other as shown in FIG. 13, and for providing a bandwidth sharing packet ring.

In the physical layer of the RPR, Ethernet (registered trademark) and SONET/SDH are adopted, so that 255 RPR stations (network devices composing the RPR; hereinafter occasionally referred to simply as stations) at the maximum are allowed to be provided for a single ring. Also, an IEEE802 48-bit MAC address (in conformity with the IEEE std 802-2002) is used for an identifier of the station.

Frame Format

FIG. 14 shows a format of a basic data frame. When the Ethernet (registered trademark) frame is relayed, an extended data frame format shown in FIG. 15 is used.

Broadcast

There are two main types for a transmission method of a broadcast frame in the RPR as follows, where a station having received the frame strips (discards) the frame when a ttl (time-to-live)=1 or sa (source address)=MAC address of the station itself:

Unidirectional Transmission (FIG. 16A)

Frames are transmitted through only one ringlet. Upon transmitting the frames, "station number-1" is set to the ttl.

Bidirectional Transmission (FIG. 16B)

Frames are transmitted through both ringlets. A cleave point is set on the ringlets and a hop number up to the cleave point is set for the ttl in each ringlet. There is not a rule concerning where the cleave point should be set. However, in most cases, the cleave point is set at the farthest point from a transmission station, i.e. at a position of (station number-1)/2 or station number/2. Also, at the time of a fault, a fault point assumes the cleave point.

It is to be noted that copy or add processing is performed at each station in both cases.

Topology Discovery

The RPR station detects a change of a network or a fault by always grasping a ring topology. Each station on the ring broadcasts a TP (topology and protection) frame that is a type of a control frame in a periodical manner where recommended value is 100 ms or when the status of the station or ring changes. FIG. 17 shows the format of the control frame, and FIG. 18 shows the format of the TP frame.

Also, by using an ATD (Attribute Discovery) frame shown in FIGS. 19A and 19B, attached information can be exchanged. The data unit of this ATD frame is in a TLV (Type-Length-Value) form as shown in FIGS. 19A and 19B.

A topology database as shown in FIG. 20 is constructed based on information collected from each station, so that a topology arrangement of an entire ring is recognized. This topology database is used for determining a transmission direction of a frame.

Fairness

This is a method of adjusting a best-effort bandwidth by using a fairness algorithm between adjacent stations in order to secure fairness of best-effort traffic between the stations.

Namely, when a congestion occurs as shown in FIG. 21, it becomes impossible for stations S2-S4 downstream from this congestion point to transmit best-effort (fairness eligible) traffic ((1) in FIG. 21). Therefore, until the congestion is resolved, a shaper of the best-effort traffic at each station is restrained. For the meantime, by a method of fairly assigning the bandwidth to all of the stations and redistributing the remainder if a usage rate does not reach 100%, the best-effort bandwidth between the stations is adjusted.

A shaping parameter for the best-effort traffic is calculated by the fairness algorithm, and transmitted, by a fairness frame of a format shown in FIG. 22, to an upstream station ((2) in FIG. 21).

Protection

By a ring protection means called steering and wrapping, an extremely high speed fault protection (avoidance) within 50 ms is guaranteed within a single ring.

Namely, when a fault section (between stations S3-S4) is found in a steering protection method shown in FIG. 23A, a source station S3 switches over (steers) a direction (ringlet) of transmitting traffic so that the traffic reaches a destination station S5 while avoiding the fault section, thereby realizing the protection.

On the other hand, when a fault section is found in a wrapping protection method shown in FIG. 23B, the traffic is looped back (loopbacks LB1 and LB2) while avoiding the fault section, thereby realizing the protection.

Inter-Ring Connection

As shown in FIG. 24, if a network is established by interconnecting a plurality of rings #1 and #2 with a single inter-ring connection device (occasionally referred to as interconnecting station) S4 (composed of a bridge S40, and RPR stations S41 and S42) or S5 (composed of a bridge S50, and RPR stations S51 and S52), a broadcast frame transferred across the rings ((1) in FIG. 24) can not be saved when a fault occurs in an interconnecting portion between the rings #1 and #2, Accordingly, in this example, it is required to provide both of the interconnecting stations S4 and S5 between the rings ((2) in FIG. 24).

However, if the rings are interconnected at a plurality of points in this way, loops are caused between the interconnecting stations S4 and S5 ((3) in FIG. 24) as shown by the thick lines, so that a broadcast storm occurs in such a case ((4) in FIG. 24) and a network is down ((5) in FIG. 24).

Therefore, a method of avoiding a loop by running a Spanning Tree Protocol (IEEE 802.1d) across the rings #1 and #2, as shown in e.g. FIG. 25, is general.

Meanwhile, as a well-known example of a method connecting a plurality of rings, there are a method of communicating between stations connecting a plurality of rings and determining working/protection (act/standby) (see e.g. patent document 1), and a method of establishing a virtual ring across a plurality of rings ((1) in FIG. 26) as shown in FIG. 26 (see e.g. patent document 2).

[Patent document 1] Japanese Patent Application Laid-open No. 2003-258822

[Patent document 2] International Publication No. WO 2004/095779

When a plurality of rings are interconnected with interconnecting stations as mentioned above, installing a redundancy protocol was required and a high-speed fault protection equivalent to the ring protection was difficult in the prior art using the Spanning Tree Protocol and the patent document 1 determining the working/protection.

Also, when a single ring is established by using a virtual ring in the same way as the patent document 2, a fault occurrence influenced the network composed of a plurality of rings ((2) in FIG. 26) in its entirety.

SUMMARY OF THE INVENTION

It is accordingly an object of the present invention to provide an inter-ring connection method and device interconnecting a plurality of RPR rings, wherein a high-speed fault switchover between a plurality of rings interconnected and a minimized fault affection can be made compatibly.

(1) In order to achieve the above-mentioned object, an inter-ring connection method or device according to the present invention respectively comprises: a first step or means determining whether or not an RPR frame received from one ring is a broadcast frame; and a second step or means resetting, when the RPR frame determined to be the broadcast frame is relayed to another ring, a ttl of the frame so that a predetermined point between the inter-ring connection device itself and another identical inter-ring connection device opposed within a ring to be relayed is a cleave point.

(2) Also, the above-mentioned second step or means respectively may include a third step or means detecting, from a topology database held by an RPR station composing the inter-ring connection device, an RPR station composing the other inter-ring connection device and calculating a predetermined point for each ringlet within the ring to be relayed (relayed destination).

(3) Also, when a broadcast frame is inserted into the ring from the inter-ring connection device, a fourth step or means respectively may be further provided which sets a ttl to the one ring regardless of the inter-ring connection device opposed, and which sets, only to the other ring, a ttl between the inter-ring connection device itself and the inter-ring connection device opposed.

(4) Also, when a broadcast frame is inserted into the ring from the inter-ring connection device, a fifth step or means respectively may be further provided which sets a ttl to all rings regardless of the inter-ring connection device opposed, and at which an inter-ring connection device which is not a source of the broadcast frame relays no broadcast frame to a ring to which a source inter-ring connection device belongs.

(5) Furthermore, an inter-ring connection method or device according to the present invention respectively may comprise: a first step or means transmitting topology information of one ring to another ring; a second step or means holding topology information of each ring in a topology database; and a third step or means relaying (unicasting) an RPR frame between the rings by referring to the topology database based on a destination address of the RPR frame.

(6) Also, a fourth step or means respectively may be further provided which counts relay traffic from the one ring to the other ring by a fairness algorithm as additional traffic to a ring to be relayed.

(7) Also, a fifth step or means respectively may be further provided which performs an RPR protection upon a fault occurrence only within the concerned ring, and which performs no RPR protection in another ring where no fault has occurred.

(8) Also, the inter-ring connection method or device respectively may further comprise a sixth step or means notifying information of a ring where a fault has occurred to another ring.

(9) Furthermore, a seventh step or means respectively may be further provided at which or by which each station having received information of a ring where a fault has occurred initializes a topology database of the ring where the fault has occurred.

The characteristics of the inter-ring connection method and device according to the above-mentioned present invention correspond to the functions described hereinafter, which will be described by referring to the attached figures.

Broadcast

FIG. 1 shows a basic processing method of a broadcast in the present invention.

Firstly, in the same way as the prior art, a ttl is set so that stations S1-S3 and S6-S8 connected to only a single ring broadcast frames within the ring to which each station belongs and the frames are transmitted ((1) in FIG. 1). In the example of FIG. 1, the ttl in the frames is set to be transmitted to a cleave point CP in a ring #1.

When e.g. an interconnecting station S5 (or S4) which is an inter-ring connection device connecting a plurality of rings receives a broadcast frame from the ring #1 and relays the received frame to another ring #2, a cleave point in the ring #2 to be relayed is reset to a predetermined point (e.g. midpoint) between the interconnecting station S5 (or S4) itself and the adjacent interconnecting station S4 (or S5) ((2) in FIG. 1). In the example of FIG. 1, the cleave point is set to a midpoint CP0 with respect to a ringlet 0, and the cleave point is set to a midpoint CP1 with respect to a ringlet 1.

Thus, the interconnecting station S5 (or S4) can avoid a loop (see FIG. 24) between the interconnecting station S5 (or S4) itself and the opposed interconnecting station S4 (or S5).

As shown in FIG. 2, when a broadcast frame BF is inserted into the rings #1 and #2 from the interconnecting station, the following two methods can be considered.

1) The interconnecting station S5 sets a ttl for the broadcast frame BF to the first ring #1 in the same way as the prior art, regardless of the opposed interconnecting station S4 ((1) in FIG. 2), and sets a ttl to a predetermined point (e.g. midpoint) between the adjacent interconnecting stations S4 and S5 as mentioned above, for the broadcast frame BF to the other ring #2 ((2) in FIG. 2). The interconnecting station S4 having received the broadcast frame BF performs relaying to the frame BF according to the basic processing method of FIG. 1.

2) The interconnecting station S5 sets a ttl 1 (CP, CP#2) to the broadcast frame BF for the broadcast frame to all of the rings (rings #1 and #2) in the same way as the prior art, regardless of the opposed interconnecting station S4, and transmits the frame. When receiving the broadcast frame BF in the ring #1, the interconnecting station S4 does not perform an inter-ring relay ((1) of FIG. 3) of the frame BF to the ring #2 to which the source interconnecting station S5 of the broadcast frame BF belongs but performs relaying only within the ring #1. When receiving the broadcast frame BF in the ring #2, the interconnecting station S4 performs the same processing.

Topology Discovery

Basically, each station broadcasts a TP frame (see FIG. 18) to a ring to which the station itself belongs in the same way as the prior art, while the station interconnecting a plurality of rings does not directly relay the TP frame to the other ring. The interconnecting station transmits topology information (station information) of the other ring to each station.

Each station having received a frame (TP/ATD frame or Organization specific OAM frame having station information on the other ring) having stored the topology information stores an interface having received the frame together with the station information in a topology database. When the same interface receives pieces of information of the same station, e.g. information whose hop number is smaller can be preferentially stored.

It is to be noted that the interconnecting station connecting a plurality of rings uses the same station identifier for all of the rings interconnected upon transmitting the TP frame. Thus, it is possible to recognize which station is the interconnecting station if the topology databases of a plurality of rings are compared.

Unicast

A unicast data frame is transferred based on the topology database. By switching a frame whose destination is a station on the other ring based on the topology database in the interconnecting station, the transmission of the RPR frame across the plurality of rings is enabled.

Fairness

Fairness processing is performed within a single ring in the same way as the prior art. However, traffic relayed from the other ring can be treated as additional traffic for the ring to be relayed in the interconnecting station.

Protection

At the time of fault occurrence, an RPR protection is executed only in the ring where the fault has occurred, and the protection is not executed in the other ring. However, the interconnecting station can notify the ring where the fault has occurred to the other ring (Organization specific OAM frame etc.). Also, each station having received fault information can initialize the topology database of the ring where the fault has occurred.

The present invention has advantages as follows compared with the prior art in which a redundancy protocol is installed on the inter-ring connection device interconnecting a plurality of rings.

The redundancy (loop prevention) protocol becomes unnecessary.

A high-speed fault protection equivalent to the ring protection is made possible.

A fault influence can be restrained within each ring, so that a fault range can be suppressed to the minimum.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 7A-7D are diagrams showing a topology database example used for the embodiment shown in FIG. 6;

FIGS. 9A-9F are diagrams showing a topology database example used for the embodiment in FIG. 8;

FIGS. 12A and 12B are diagrams showing a topology database example used for the embodiment in FIG. 11;

DESCRIPTION OF THE EMBODIMENTS

Hereinafter, an embodiment of an inter-ring connection method and device according to the present invention will be described by referring to the attached figures.

Figure 24:
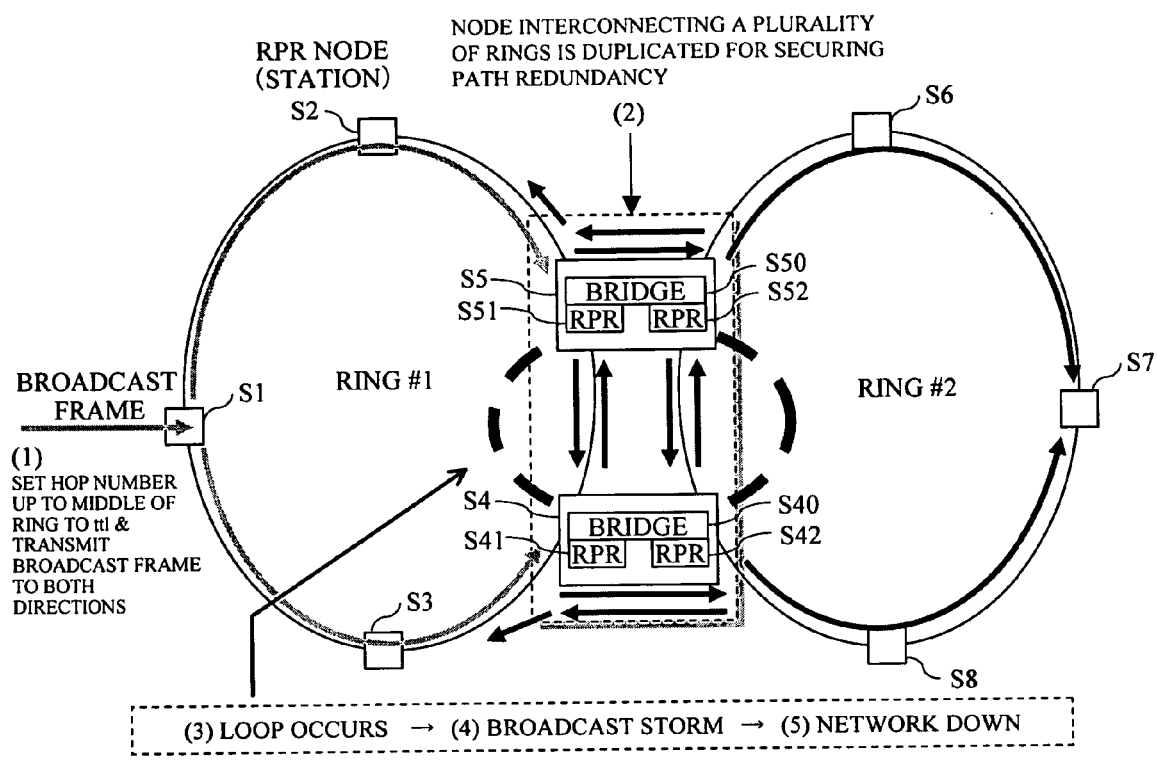
FIG. 24 is a block diagram showing a loop fault when RPR rings are interconnected with an inter-ring connection device.

Firstly, a network example composed of two rings as shown in FIG. 24 is applied. In this example, the ring #1 is composed of the stations S1-S5, the ring #2 is composed of the stations S4-S8, and the rings #1 and #2 are interconnected with the interconnecting stations S4 and S5.

Figure 4:
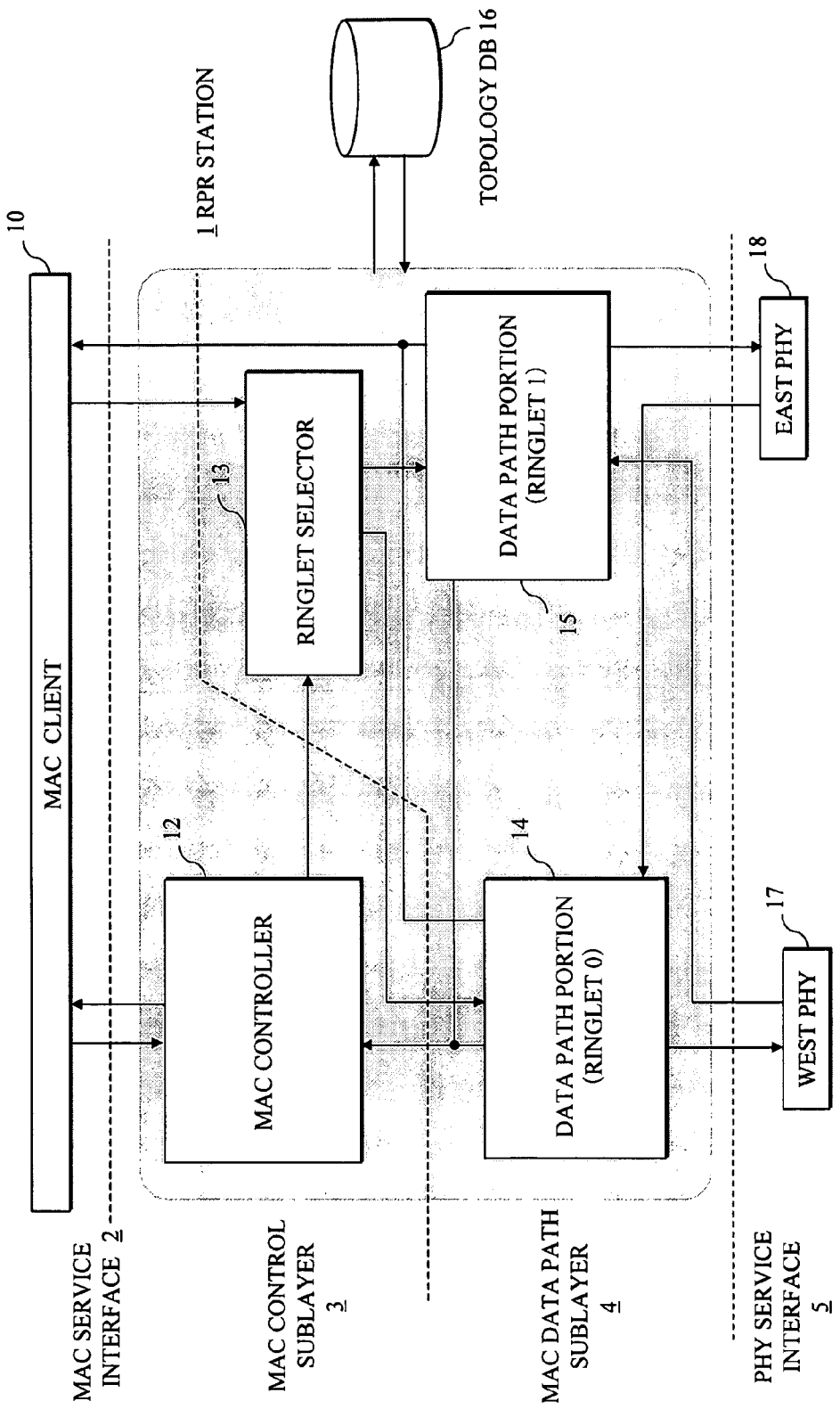
FIG. 4 is a block diagram showing an arrangement of an RPR station conventionally known as used for an inter-ring connection method and device according to the present invention.
Figure 5:
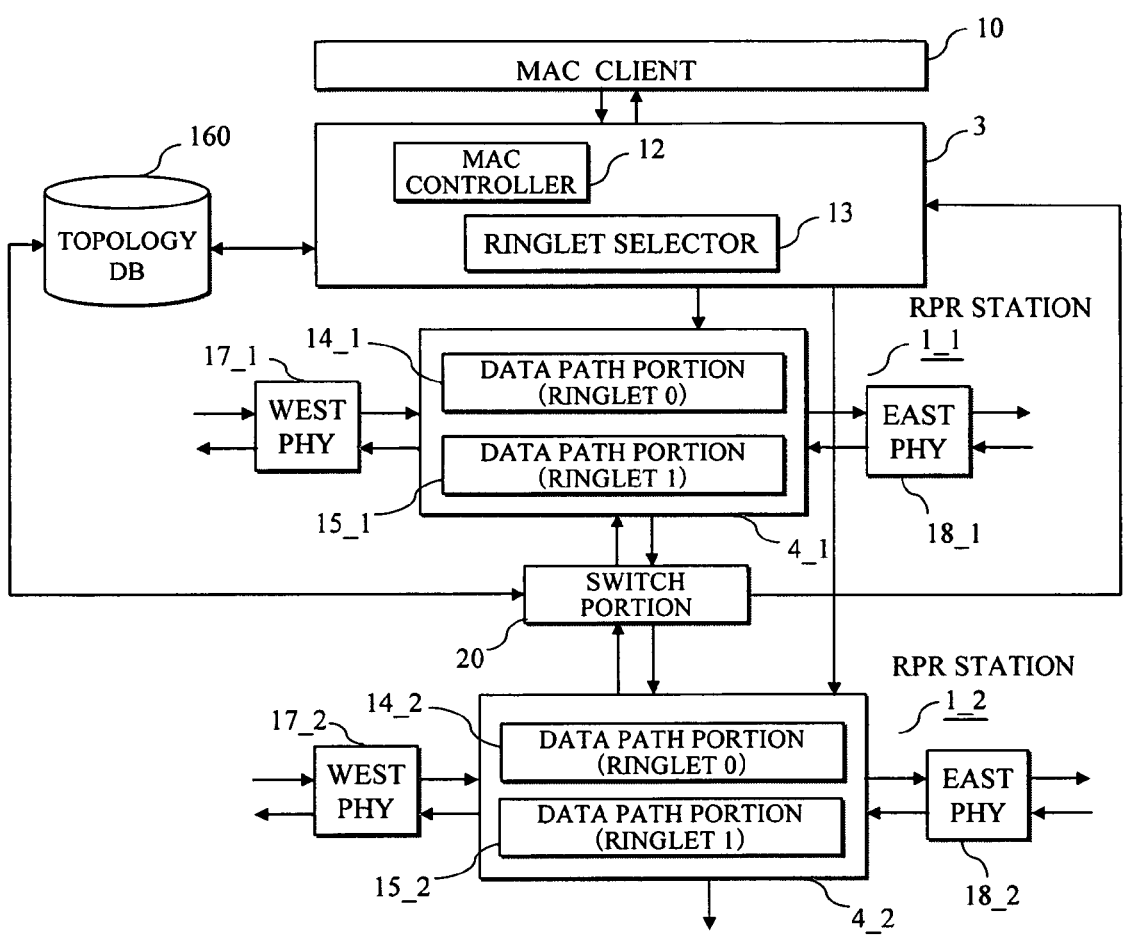
FIG. 5 is a block diagram showing an arrangement of an interconnecting station as an inter-ring connection device according to the present invention.

FIG. 4 shows an arrangement of the stations S1-S3 and S6-S8 having been conventionally used in such a network. FIG. 5 shows an arrangement of the interconnecting stations S4 and S5 as the inter-ring connection devices according to the present invention.

Firstly, step 1 shown in FIG. 4 is composed of a MAC controller 12 of a MAC control sublayer 3 interconnected to a MAC client 10 with a MAC service interface 2, data path portions 14 and 15 (respectively corresponding to ringlets 0 and 1) composing a MAC data path sublayer 4 and interconnected respectively to the MAC controller 12 and a ringlet selector 13, a west PHY 17 and an east PHY 18 respectively interconnected to the data path portions 14 and 15 with a PHY service interface 5, and a topology database (DB) 16 storing topology information.

It is to be noted that the MAC controller 12 has functions of a control interface, a fairness algorithm, a protection, a topology management, an OAM, and a transmission/reception of control frames. The ringlet selector 13 has functions of a ringlet selection, a flooding selection, and a frame format selection. Furthermore the data path portion has functions of encapsulation/decapsulation, shaping, queuing, frame strip, and transmission/reception of frames.

Figure 25:
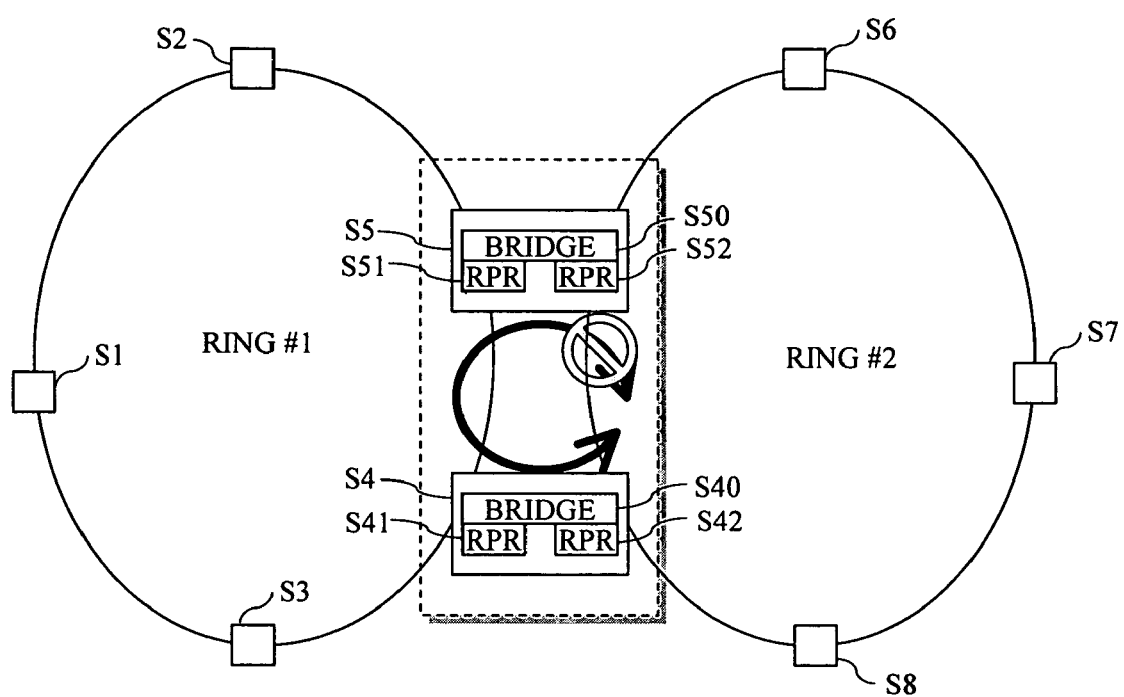
FIG. 25 is a block diagram showing a prior art example using a loop prevention/redundancy protocol (STP etc.) for preventing a loop fault in FIG. 24.
Figure 26:
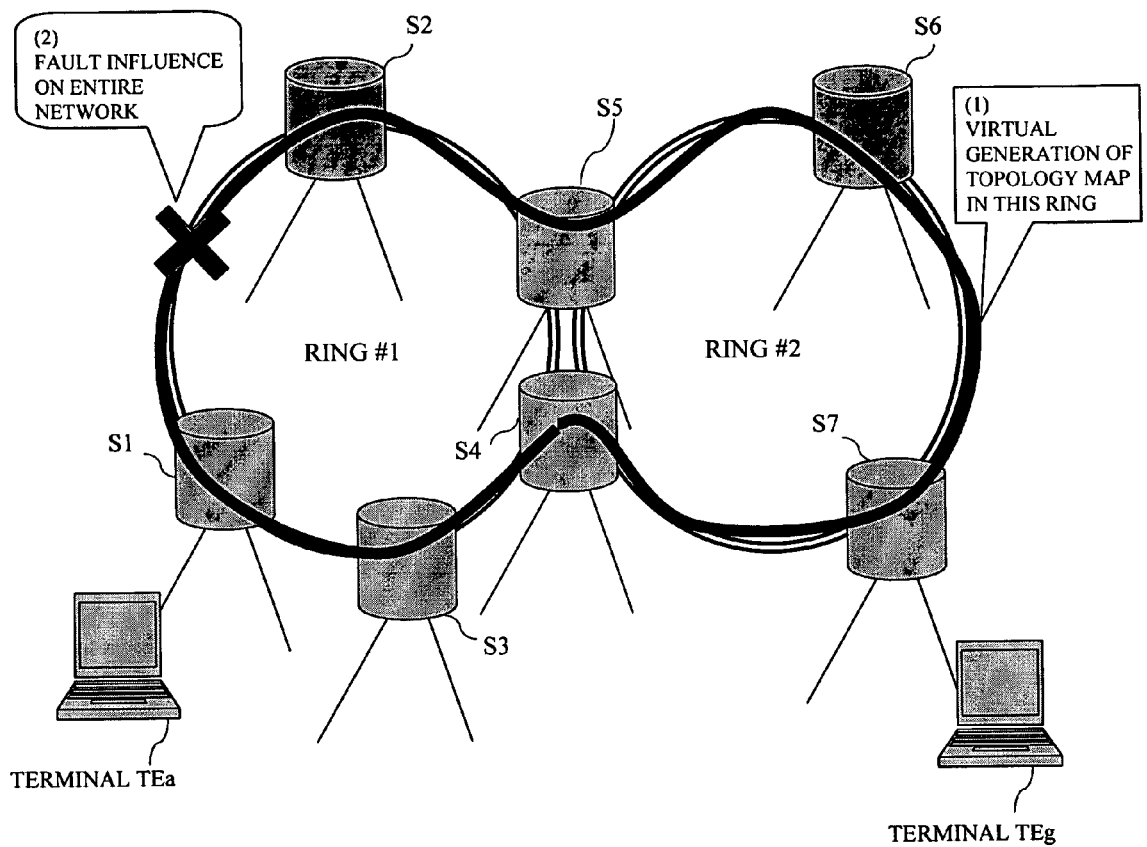
FIG. 26 is a block diagram showing a prior art arrangement using a virtual ring for preventing the loop fault in FIG. 24.

Also, the interconnecting station shown in FIG. 5 has an arrangement similar to that of the interconnecting station S4 or S5 shown in FIGS. 24 and 25. Namely, an RPR station 1_1 has data path portions 14_1 and 15_1, a west PHY 17_1, and an east PHY 18_1. An RPR station 1_2 has data path portions 14_2 and 15_2, a west PHY 17_2, and an east PHY 18_2. The MAC controller 12, the ringlet selector 13, a switch portion 20, and a topology database 160 compose a bridge between the RPR stations 1_1 and 1_2.

Embodiments of the present invention including such stations and interconnecting stations will now be described per function as described above.

Embodiment of Topology Database Construction: FIGS. 6 and 7A-7D

Figure 6:
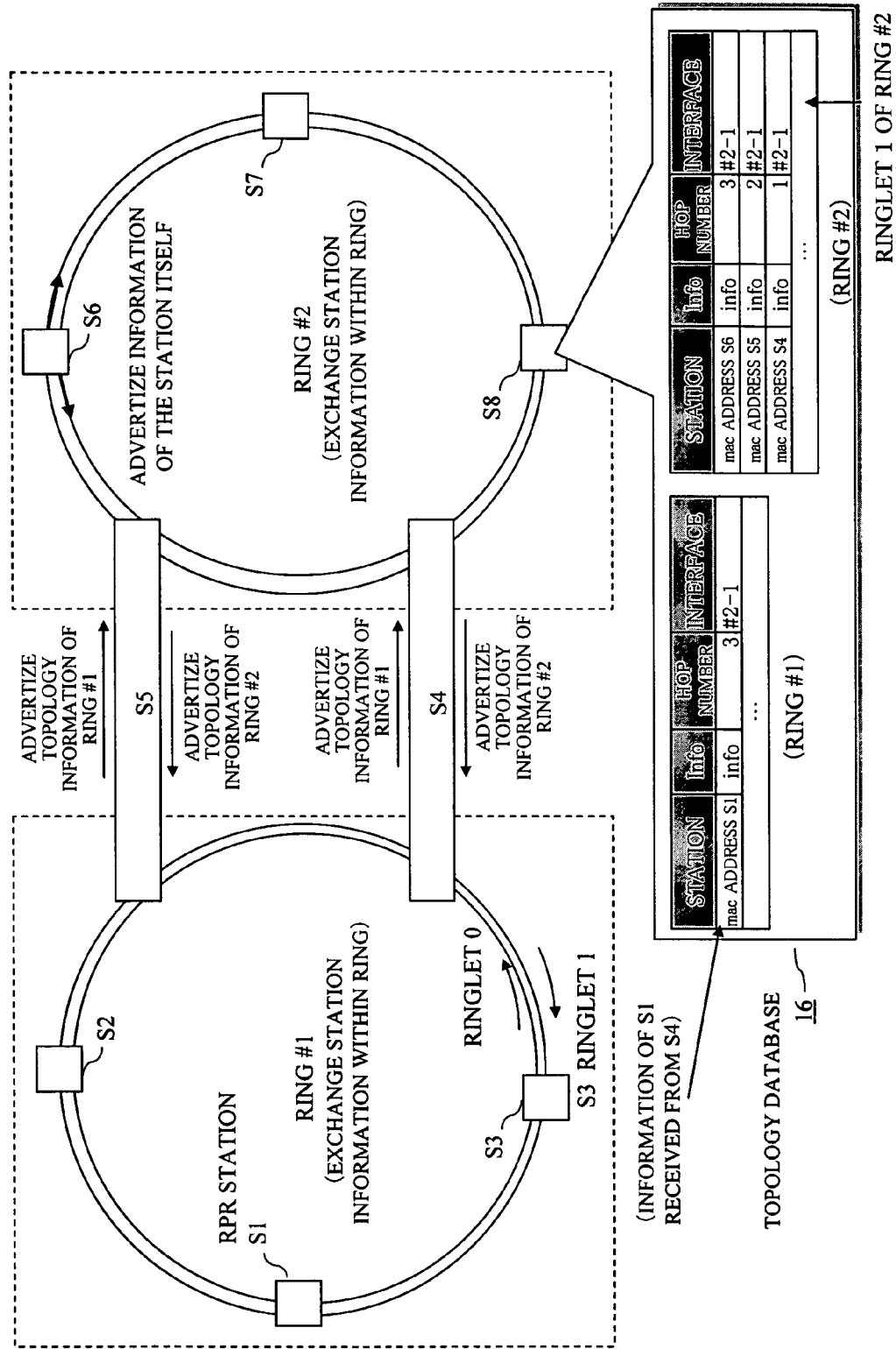
FIG. 6 is a block diagram showing an embodiment of a topology database construction in an arrangement of a plurality of rings.

Firstly, in the example of the network establishment shown in FIG. 6 (basic arrangement is the same as that of each network mentioned above), each station exchanges TP frames within the respective rings #1 and #2, and prepares the topology database of the ring itself. When e.g. the station S8 receives the TP frame of the station S7 in the ringlet 1, that fact is registered in the topology database 16 (see FIG. 4) as an interface which can be transmitted on the ringlet 0 side. Similarly, when receiving the TP frame of the station S7 in the ringlet 0, that fact is registered on the ringlet 1 side. As a result, the topology database of the ring #2 held by the station S8 is as shown in FIG. 7D.

The interconnecting stations S4 and S5 commonly connected to two rings #1 and #2 have both topology databases of the rings #1 and #2 as shown in FIGS. 7A and 7B. Therefore, the interconnecting stations S4 and S5 advertise the topology information of the ring #1 to the ring #2, and the topology information of the ring #2 to the ring #1 as shown in FIG. 6.

However, for the advertisement from e.g. the ring #1 to the ring #2, only the unshaded or unhatched parts have to be broadcasted as a minimum condition. Namely, important is a shortest path (minimum hop number) to the stations S1-S3 connected only to the ring #1.

Finally, the station S8 constructs the topology database related to the ring #1 shown in FIG. 7C from the above-mentioned information received from the interconnecting stations S4 (hop number between S8 and S4 is "1") and S5 (hop number is "2"). Thus, each station has the topology information of two rings #1 and #2.

Also, if the topology information of the ring #1 is compared with that of the ring #2 (if a logical product is obtained with a station ID, it is recognized that the interconnecting stations S4 and S5 interconnect two rings #1 and #2.

Embodiment of Broadcast

Figure 1:
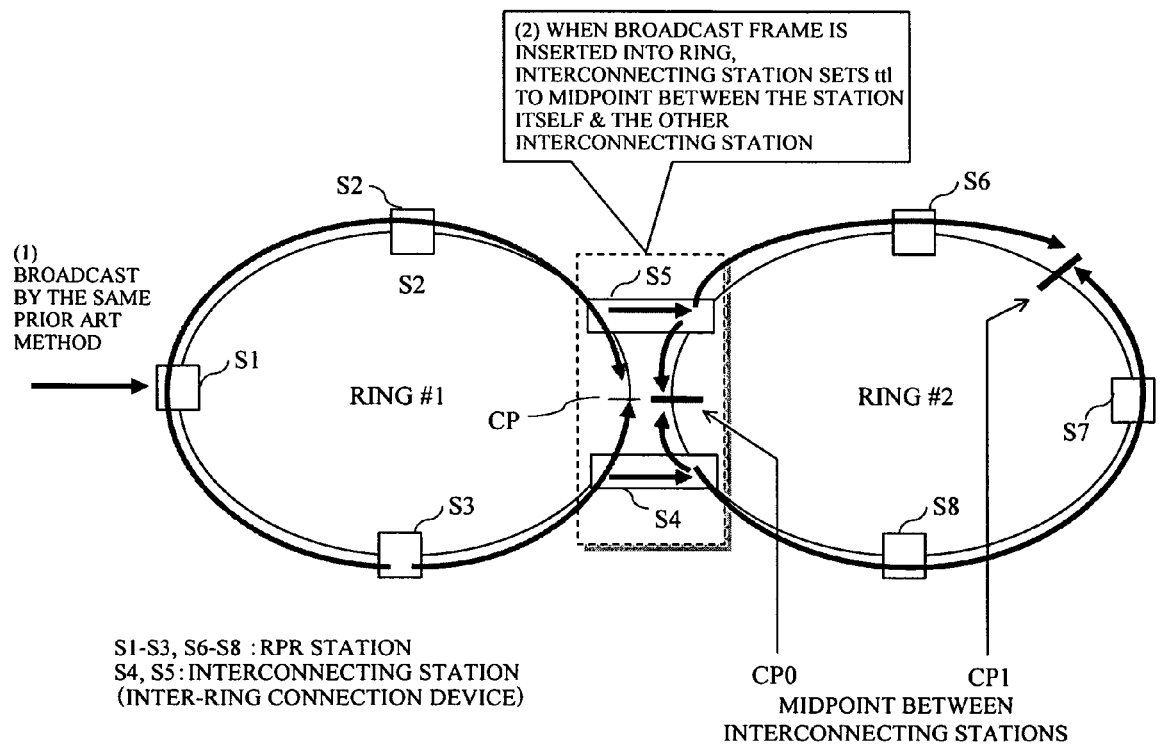
FIG. 1 is a block diagram showing a principle (1) (broadcast frame processing between a plurality of rings) of an inter-ring connection method and device according to the present invention.
Figure 2:
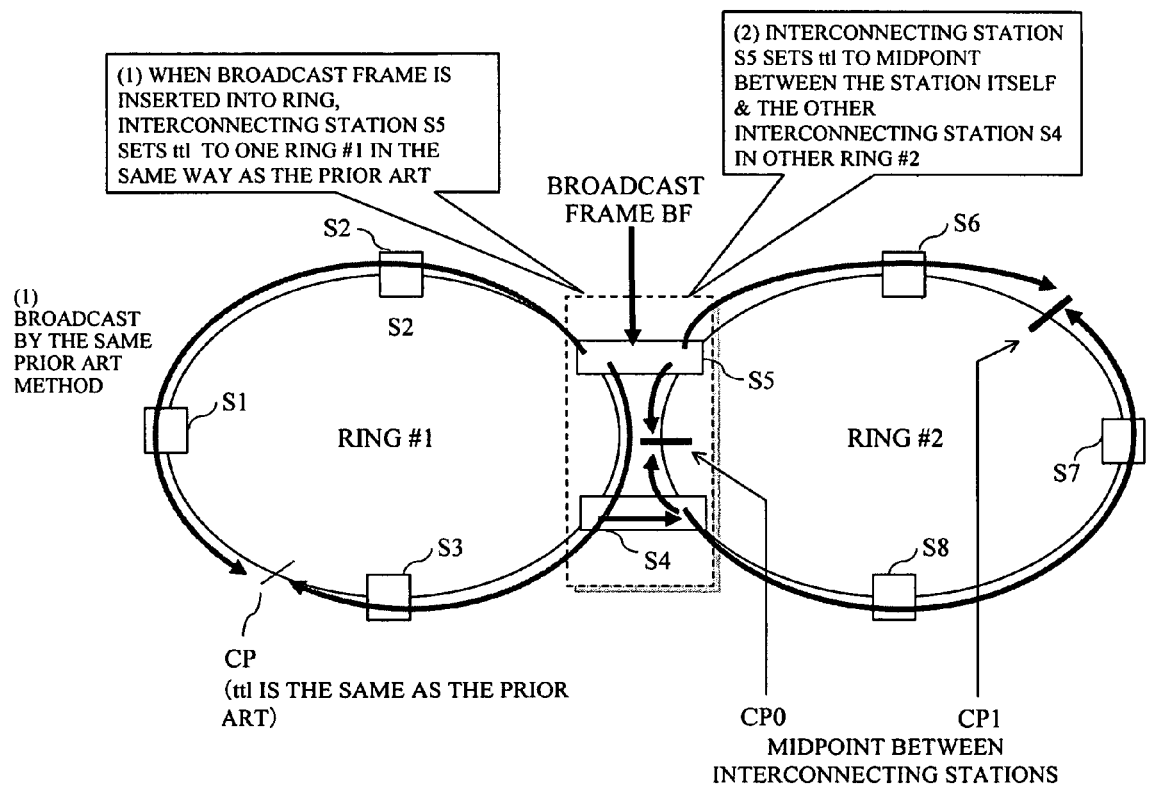
FIG. 2 is a block diagram showing a principle (2) (broadcast frame transmission from inter-ring connection device: No. 1) of an inter-ring connection method and device according to the present invention.
Figure 3:
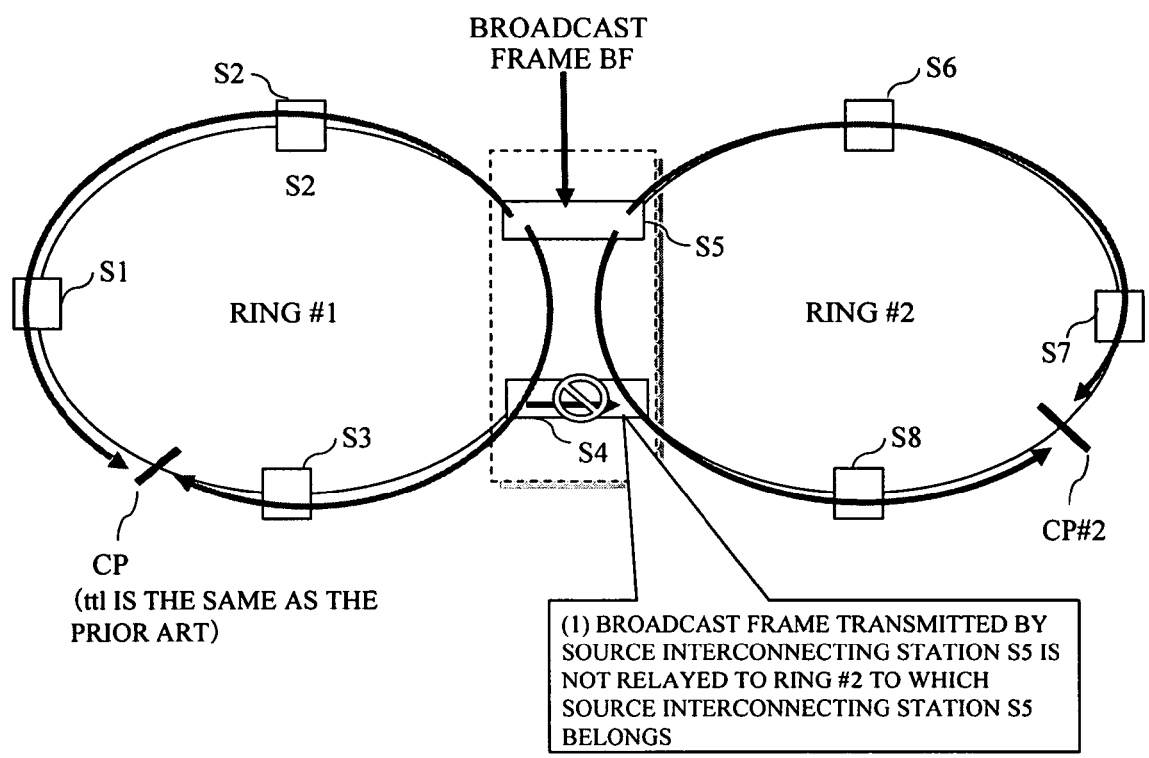
FIG. 3 is a block diagram showing a principle (3) (broadcast frame transmission from inter-ring connection device: No. 2) of an inter-ring connection method and device according to the present invention.

The transmission of the broadcast frame from the station S2 will now be considered in the same way as the case shown in FIG. 1.

The station S1 considers only the broadcasting within the ring #1, and sets a ttl (sets a cleave point CP between the interconnecting stations S4 and S5, which is the farthest point from the station S1). When receiving the broadcast frame on the ring #1, the interconnecting stations S4 and S5 transfer the broadcast frame to the ring #2.

However, the ttl is set so that each station in the ring #2 may not doubly receive the frame. In e.g. the interconnecting station S4, a cleave point CP0 is set at the midpoint between the interconnecting station itself and the adjacent interconnecting station S5, i.e. between the stations S6 and S7 in the ringlet 0, and a cleave point CP1 is set between the stations S4 and S5 in the ringlet 1, and both are reset in the switch portion 20. However, since ttl=1 (or 0) in this case in the transmission to the ringlet 1, it is not actually performed.

Also, when the broadcast frame is transmitted from the interconnecting station S5, there are following two methods.

1) A ttl is set to a single ring (e.g. ring #1) in the same way as the prior art (so that the cleave point may be between the stations S1 and S3), and in the other ring (ring #2), the ttl is set to the midpoint between the interconnecting station itself and the adjacent interconnecting station S4 (cleave point is between the interconnecting stations S4 and S5, and S6 and S7). In this case, the interconnecting station S4 having received the broadcast frame in the ring #1 relays the broadcast frame to the ring #2 (cleave point is between the interconnecting stations S4 and S5, and stations S6 and S7).

2) The interconnecting station S5 transmits the broadcast frame, in the same way as the prior art, to the rings #1 and #2 (e.g. cleave point in the ring #1 is between S1 and S3, and cleave point in the ring #2 is between S7 and S8). Then, the interconnecting station S4 in the ring #1 receives the broadcast frame transmitted from the interconnecting station S5. However, an inter-ring relay of the frame is not performed to the ring #2 to which the source station S5 of the broadcast frame belongs (relayed only within the ring #1). The same applies to the case where the frame is received in the ring #2.

Embodiment of Unicast: FIGS. 8 and 9A-9F

Figure 8:
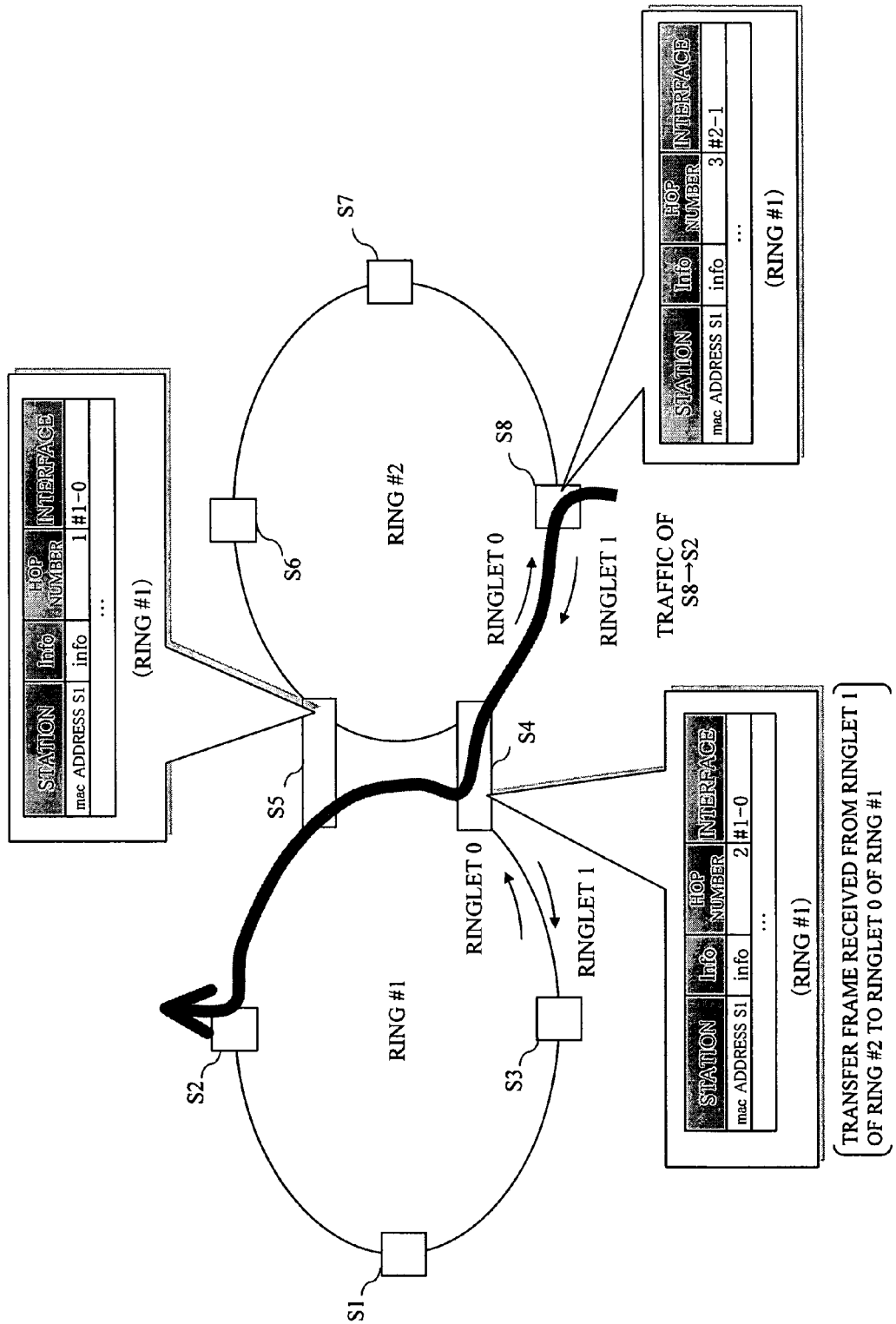
FIG. 8 is a block diagram showing an embodiment (traffic of S8→S2) of a unicast in the present invention.

As shown in FIG. 8, in the network arrangement in the same way as the above, the case where the RPR frame is transmitted from the station S8 to the station S2 will be considered.

At this time, the station S8 retrieves a mac address S2 which is a destination address of a frame from topology databases shown in FIGS. 9A and 9B, so that it is found that the station S2 is located in the ringlet 1 in the ring #2, i.e. beyond the interconnecting station S5 (hop number=3).

The interconnecting station S4 having received a frame from the station S8 (ring #2-ringlet 1) retrieves the topology database of the ring #1 since it is found that the mac address S2 which is the destination address of the frame received in the ring #2 does not exist in the ring #2 from the topology databases shown in FIGS. 9C and 9D. By being recognized that the station S2 is located beyond the ring #1-ringlet 0, the concerned frame is transferred from the ring #2-ringlet 1 to the ring #1-ringlet 0.

It is to be noted that while two entries of the interfaces=#1-0 and #1-1 are hit in this case, the relaying to the #1-0 is selected based on the difference of the hop numbers.

It is recognized in the interconnecting station S5 based on the information of FIGS. 9E and 9F that the mac address S2 which is the destination address of the frame received in the ring #1 is in the ring #1. Therefore, the frame is relayed as it is by the ringlet 0 in the ring #1, so that the frame reaches the station S2 which is the destination.

Figure 10:
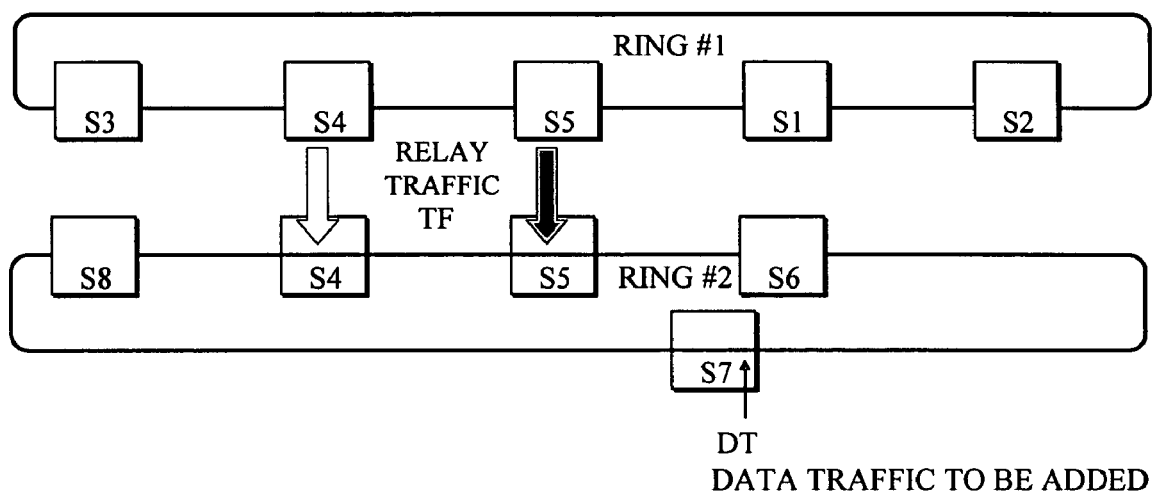
FIG. 10 is a block diagram showing an embodiment in fairness for traffic across rings in the present invention.

Embodiment of Fairness: FIG. 10

A traffic TF relayed between the rings #1 and #2 is treated equivalent to additional traffic DT for the ring #2 to be relayed.

Figure 11:
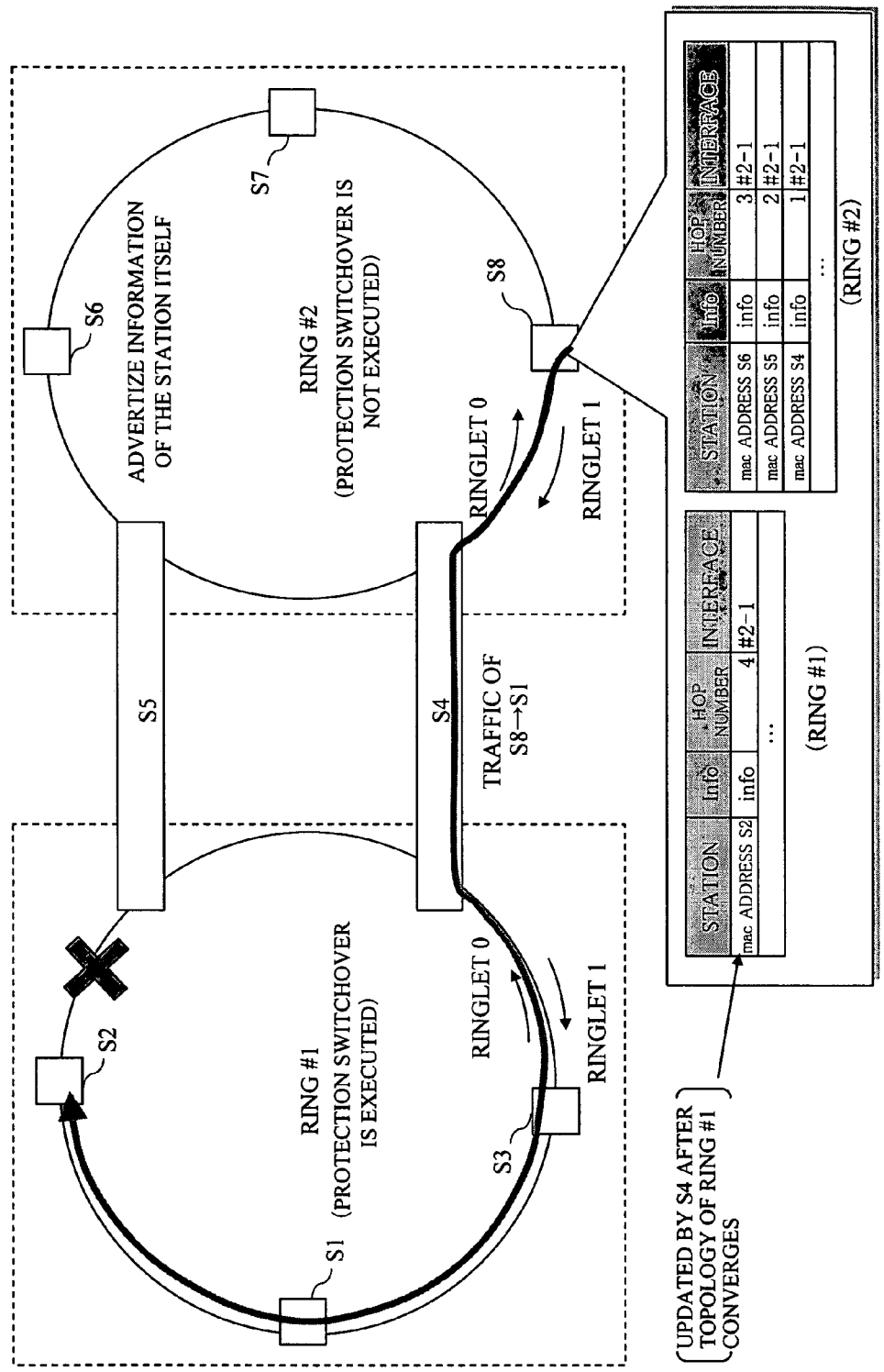
FIG. 11 is a block diagram showing a protection embodiment (traffic of S8→S2) in the present invention.
Figure 13:
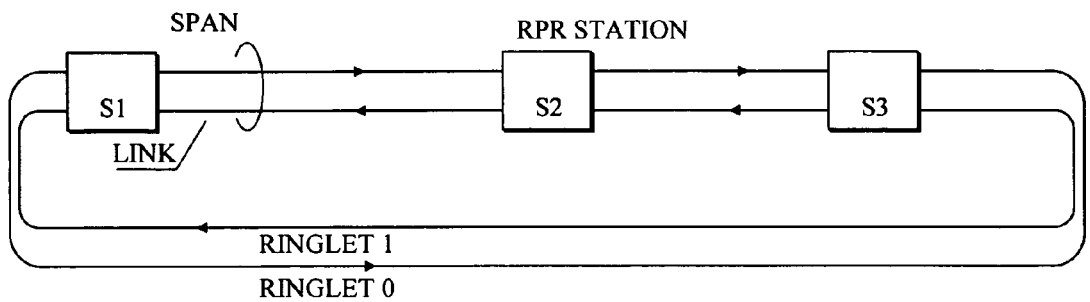
FIG. 13 is a block diagram showing a summary of the RPR conventionally known used in the present invention.
Figure 14:
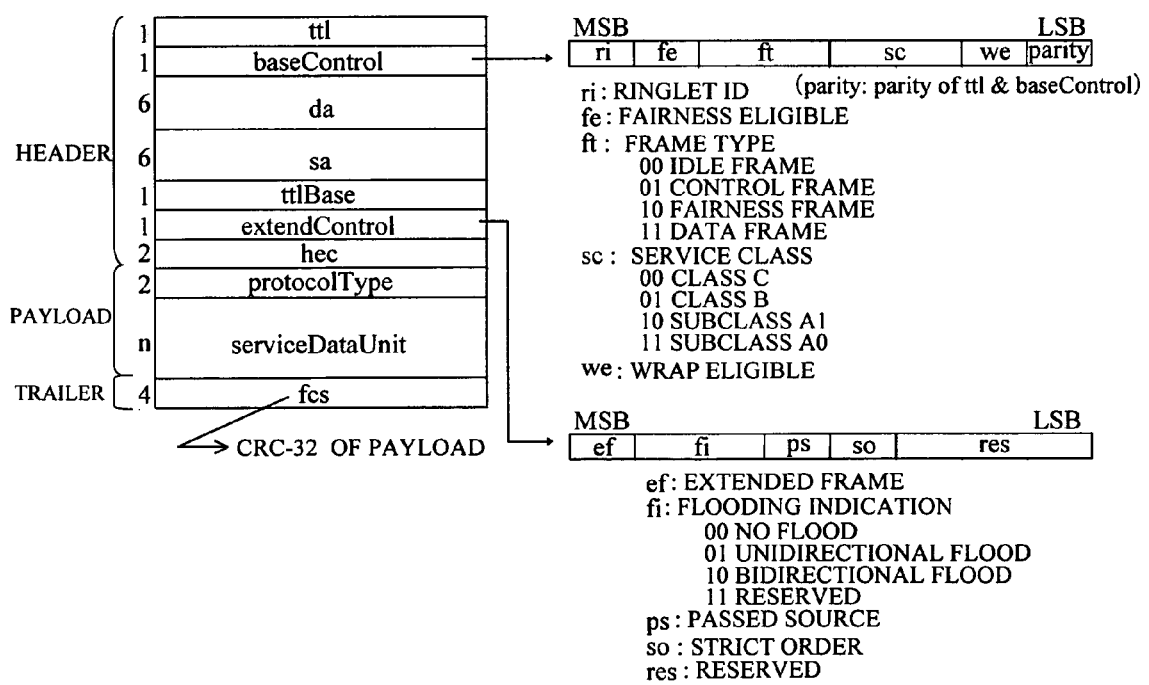
FIG. 14 is a format diagram of an RPR basic frame.
Figure 15:
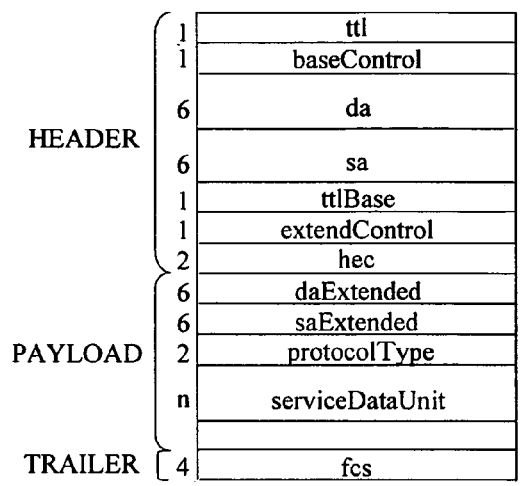
FIG. 15 is a format diagram of an extended frame of an RPR frame.
Figure 16A:
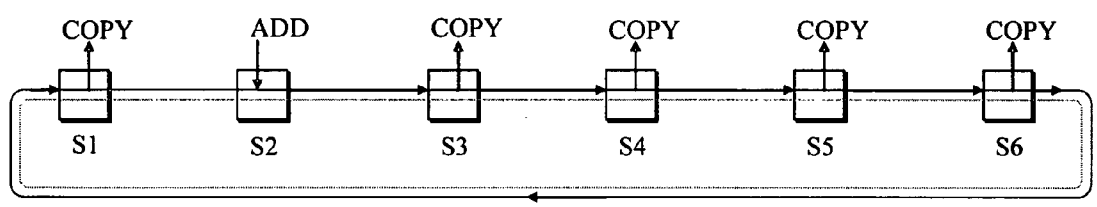
FIGS. 16A and 16B are block diagrams showing a broadcast example in an RPR.
Figure 16B:
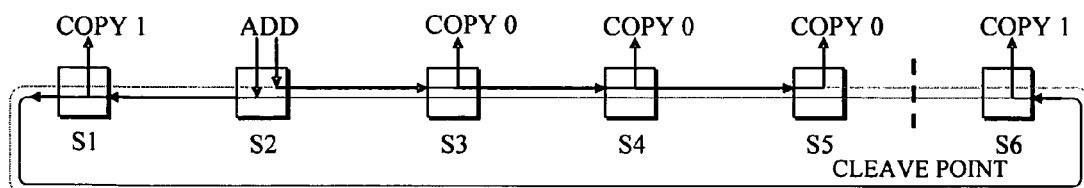
Figure 17:
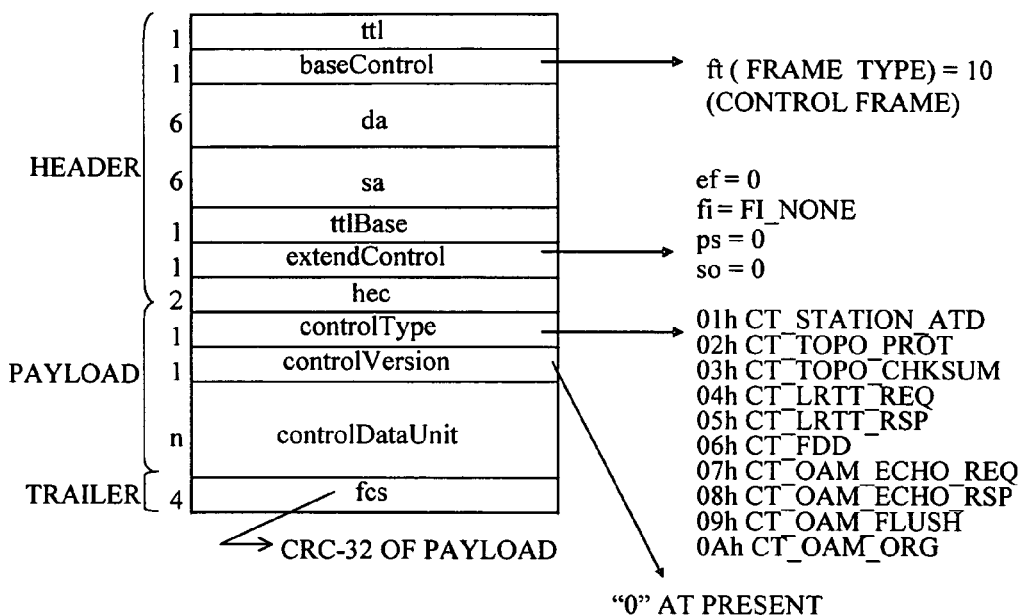
FIG. 17 is a format diagram of a control frame in an RPR.
Figure 18:
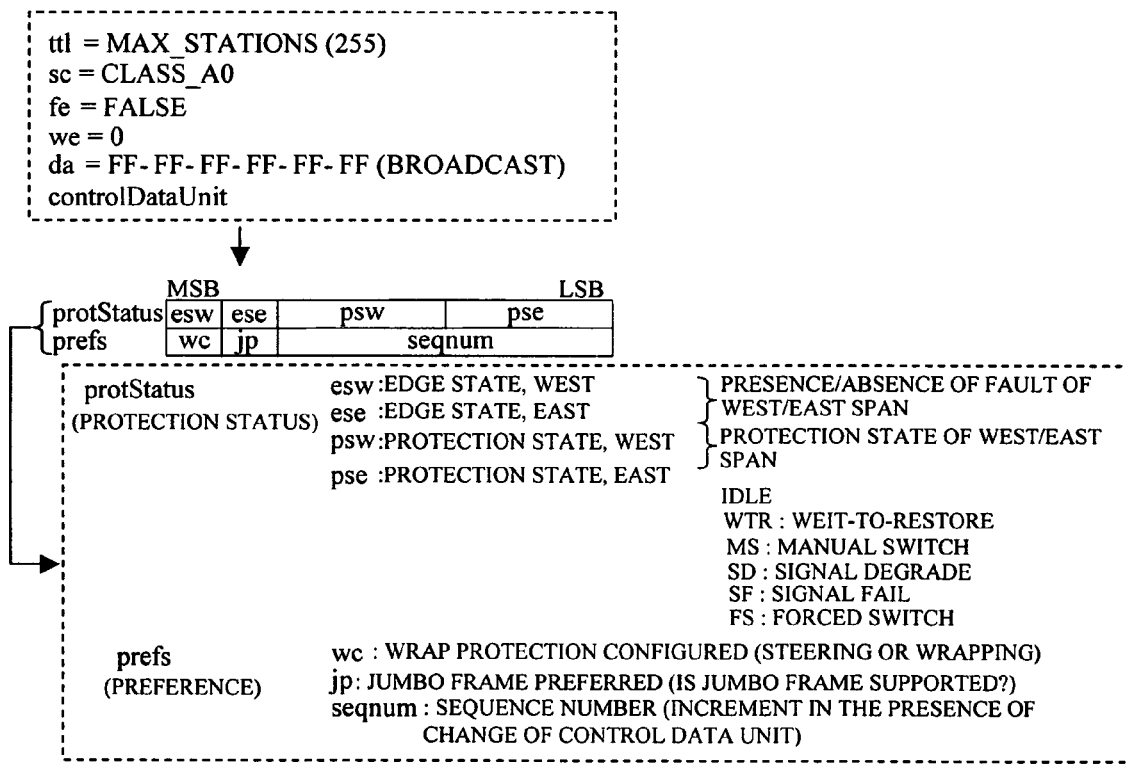
FIG. 18 is a format diagram of a TP frame in an RPR.
Figure 19A:
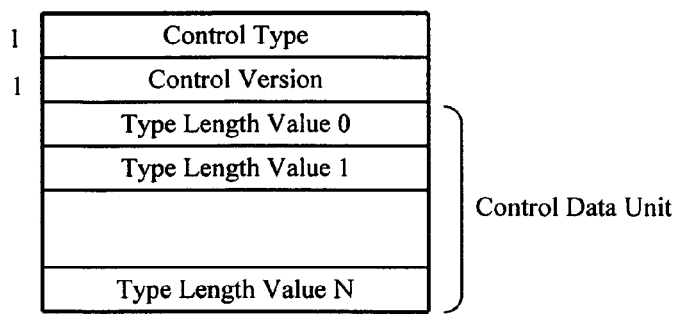
FIGS. 19A and 19B are format diagrams of an ATD frame in an RPR.
Figure 19B:
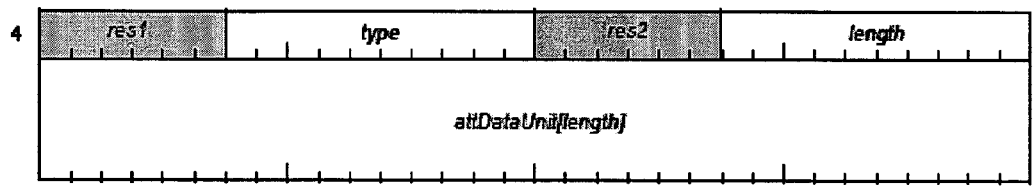
Figure 20:
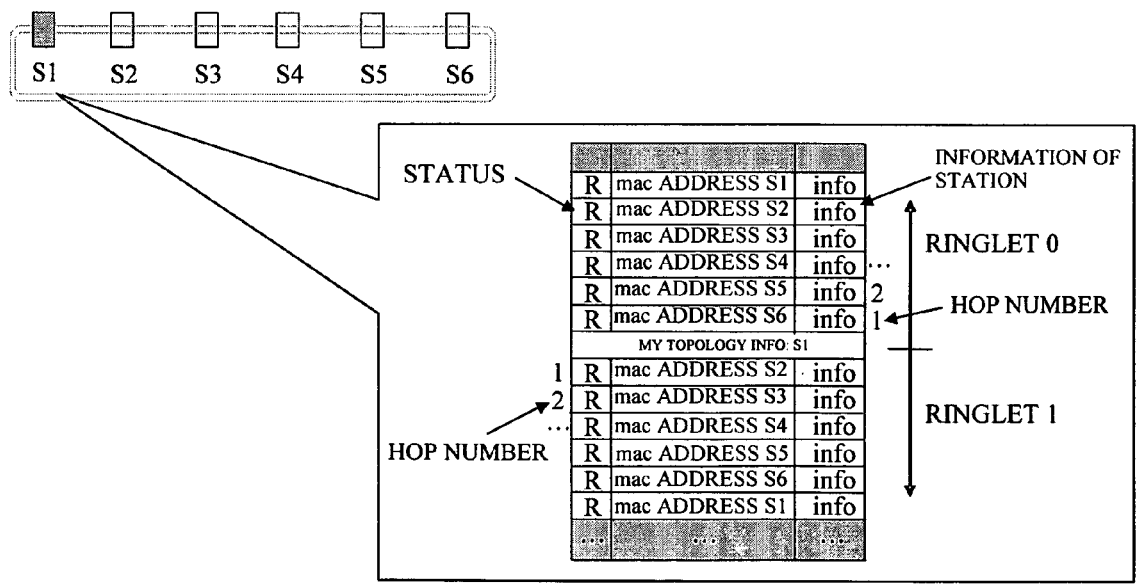
FIG. 20 is a block diagram showing a topology database example in an RPR.
Figure 21:
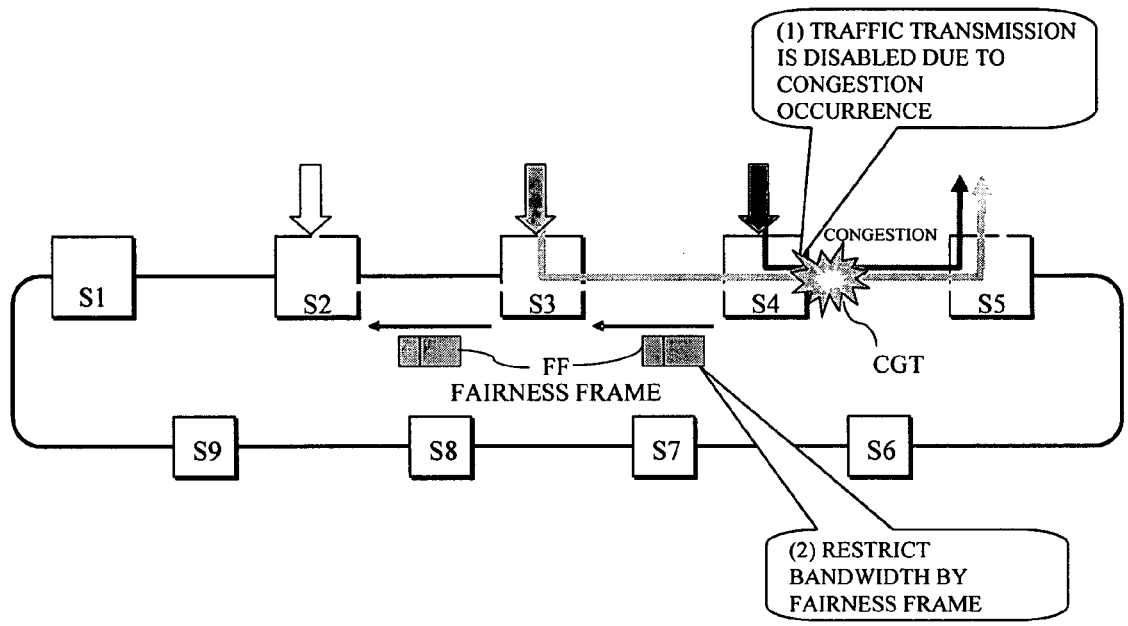
FIG. 21 is a block diagram showing a summary of a fairness operation in an RPR.
Figure 22:
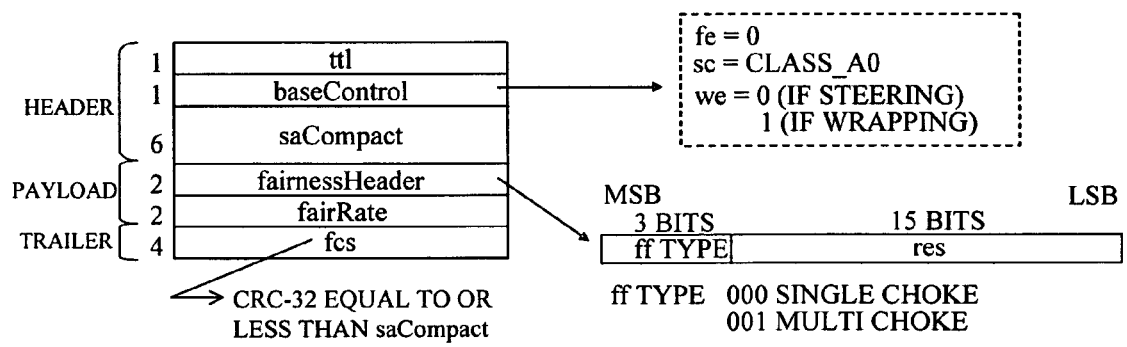
FIG. 22 is a format diagram of a fairness frame in an RPR.
Figure 23A:
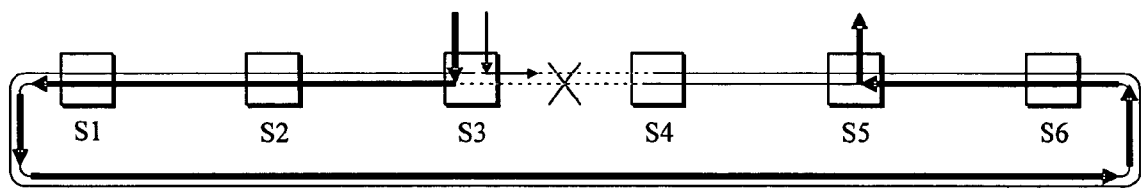
FIGS. 23A and 23B are block diagrams showing a protection example in an RPR.
Figure 23B:
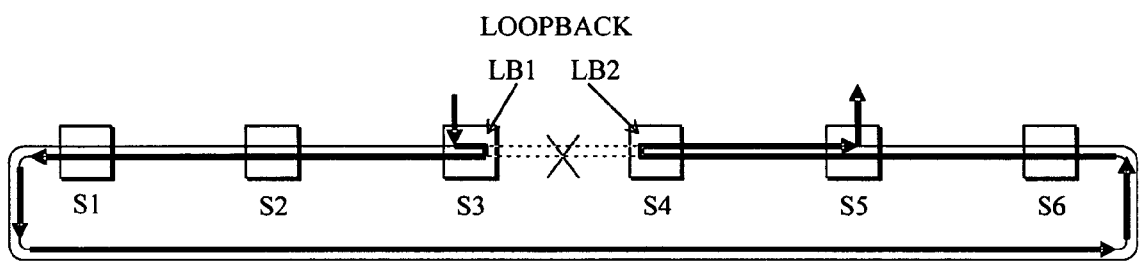

Protection: FIGS. 11, 12A and 12B

The case where a fault has occurred between the station S1 and the interconnecting station S5 in the ring #1, as shown in FIG. 11, will now be described.

Together with the fault occurrence between the station S1 and the interconnecting station S5, a protection is performed within the ring #1. The fault occurrence in the ring #1 is notified to each station in the ring #2. Each station in the ring #2 having recognized the fault occurrence in the ring #1 initializes the topology database of the ring #1. This is because of a possibility of change of the shortest path due to the fault. As a result, even at the station S8, as shown in FIGS. 12A and 12B, the hop number up to the station S1 is changed compared with the hop number before the fault.

However, the protection is not performed within the ring #2, so that the communication is performed unchanged. While the protection is performed in the ring #1, the communication of each station in the ring #1 is interrupted. However, the communication of each station in the ring #2 is not interrupted.

After the protection occurs, at the time when the topology of the ring #1 converges, the interconnecting stations S4 and S5 notify the topology information of the ring #1 to each station in the ring #2. At this time, the traffic between rings from the station S8 to the station S2 is transmitted from the station S8 in the same way as the normal time. When the traffic is relayed to the ring #1 by the interconnecting station S4, it is relayed in the direction opposite to the normal time by performing e.g. the steering protection.

What is claimed is:

1. An inter-ring connection method using an inter-ring connection device interconnecting a plurality of RPR rings comprising:
   a first step of determining whether or not an RPR frame received from one ring is a broadcast frame; and
   a second step of resetting, when the RPR frame determined to be the broadcast frame is relayed to another ring, a ttl of the frame so that a predetermined point between the inter-ring connection device itself and another identical inter-ring connection device opposed within a ring to be relayed is a cleave point for avoiding double receptions.

2. The inter-ring connection method as claimed in claim 1, wherein the second step includes a third step of detecting, from a topology database held by an RPR station composing the inter-ring connection device, an RPR station composing the other inter-ring connection device and of calculating a predetermined point for each ringlet within the ring to be relayed.

3. The inter-ring connection method as claimed in claim 2, further comprising a fourth step of setting, when a broadcast frame is inserted into the ring from the inter-ring connection device, a ttl to the one ring regardless of the inter-ring connection device opposed, and of setting, only to the other ring, a ttl between the inter-ring connection device itself and the inter-ring connection device opposed.

4. The inter-ring connection method as claimed in claim 2, further comprising a fifth step of setting, when a broadcast frame is inserted into the ring from the inter-ring connection device, a ttl to all rings regardless of the inter-ring connection device opposed, and at which an inter-ring connection device which is not a source of the broadcast frame relays no broadcast frame to a ring to which a source inter-ring connection device belongs.

5. An inter-ring connection device interconnecting a plurality of RPR rings comprising:
   a first means determining whether or not an RPR frame received from one ring is a broadcast frame; and
   a second means resetting, when the RPR frame determined to be the broadcast frame is relayed to another ring, a ttl of the frame so that a predetermined point between the inter-ring connection device itself and another identical inter-ring connection device opposed within a ring to be relayed is a cleave point for avoiding double receptions.

6. The inter-ring connection device as claimed in claim 5, wherein the second means includes a third means detecting, from a topology database held by an RPR station composing the inter-ring connection device, an RPR station composing the other inter-ring connection device and calculating a predetermined point for each ringlet within the ring to be relayed.

7. The inter-ring connection device as claimed in claim 6, further comprising a fourth means setting, when a broadcast frame is inserted into the ring from the inter-ring connection device, a ttl to the one ring regardless of the inter-ring connection device opposed, and setting, only to the other ring, a ttl between the inter-ring connection device itself and the inter-ring connection device opposed.

8. The inter-ring connection device as claimed in claim 6, further comprising a fifth means setting, when a broadcast frame is inserted into the ring from the inter-ring connection device, a ttl to all rings regardless of the inter-ring connection device opposed, and relaying no broadcast frame to a ring to which a source inter-ring connection device belongs when an inter-ring connection device is not a source of the broadcast frame.

* * * * *